United States Patent
Cloutier (10) Patent No.: US 6,244,536 B1
(45) Date of Patent: Jun. 12, 2001

(54) AIR TO AIR HOMING MISSILE GUIDANCE

(75) Inventor: James R. Cloutier, Niceville, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 208 days.

(21) Appl. No.: 09/197,927

(22) Filed: Nov. 23, 1998

Related U.S. Application Data (60) Provisional application No. 60/066,661, filed on Nov. 26, 1997.

(51) Int. Cl.[7] ......................................................... F41G 7/36
(52) U.S. Cl. ........................... 244/3.19; 342/62; 244/3.14; 244/3.15; 701/1; 701/4
(58) Field of Search ..................................... 244/3.1, 3.15, 244/3.16–3.22, 3.14; 342/62; 701/1–6, 11

(56) References Cited

U.S. PATENT DOCUMENTS

| | | |
|---|---|---|
| 3,946,968 | 3/1976 | Stallard . |
| 3,951,358 | 4/1976 | DeLano et al. . |
| 4,234,142 | 11/1980 | Yost et al. . |
| 4,825,055 | 4/1989 | Pollock . |
| 6,064,332 | * 5/2000 | Cloutier ................................ 342/62 |

FOREIGN PATENT DOCUMENTS

0419644 * 4/1991 (EP) .

* cited by examiner

Primary Examiner—Bernarr E. Gregory
(74) Attorney, Agent, or Firm—Gerald B. Hollins; Thomas L. Kundert (57) ABSTRACT

An air to air homing missile guidance algorithm based on a state-dependent Riccati equation solution of a spherical-based nonlinear intercept representation of the intercept kinematics problem. The achieved algorithm also provides characteristics asymptotically stabilizing the intercept kinematics achieved with the classic proportional navigation or PRONAV intercept algorithm but provides reduced hunting instability and other fuel-consuming and time consuming missile maneuvers. The disclosed algorithm is in the form of four state equations, two equations for an angular acceleration embodiment and two for a linear acceleration embodiment. Each such embodiment includes seven state variables each having a gain coefficient of complex fraction form; each embodiment is additionally refined for differing cross-channel couplings. Each algorithm avoids need to estimate the time-to-go parameter and achieves indirect rather than faulted direct minimization of missile miss distance when provided with accurate target and missile acceleration data.

24 Claims, 2 Drawing Sheets

Fig. 3

AIR TO AIR HOMING MISSILE GUIDANCE

CROSS REFERENCE TO RELATED PATENT DOCUMENTS

This application claims the benefit of Provisional Application 60/066,661, filed Nov. 26, 1997. The application is somewhat related to the previously filed and commonly assigned patent applications "Proportional Guidance (PROGUIDE) and Augmented Proportional Guidance (Augmented Proguide)", AF 21054, Ser. No. 08/233,588, filed Apr. 26, 1994, now U.S. Pat. No. 6,064,332, and "Adaptive Matched Augmented Proportional Navigation", AF 21474, Ser. No. 08/753,754, filed Nov. 29, 1996, an S.I.R. Application.

RIGHTS OF THE GOVERNMENT

The invention described herein may be manufactured and used by or for the Government of the United States for all governmental purposes without the payment of any royalty.

BACKGROUND OF THE INVENTION

Perhaps the most challenging of all guidance and control problems is that of a tactical air-to-air missile in pursuit of a highly maneuverable target aircraft. The problem presented to this missile may be divided into several parts which include the estimation of target motion, the generation of guidance commands to optimally steer the missile toward target intercept and control of the coupled, nonlinear, multivariable, uncertain dynamics of the air-to-air missile. Each portion of this problem, i.e., estimation, guidance and control, is inherently nonlinear and time varying, and a solution of all three problem parts combines to comprise a complex integrated system.

The traditional approach to homing guidance of such a missile employs the proportional navigation (PRONAV) guidance algorithm. The PRONAV algorithm was developed by C. Yuan at RCA Laboratories during World War II using intuition; see Yuan, C. L., "Homing and Navigation Courses of Automatic Target-Seeking Devices," RCA Laboratories, Princeton N.J., Report PTR-12C, December 1942. The resulting simplistic guidance law states that the commanded linear acceleration of the missile, $\alpha_c$, is proportional to the line-of-sight (LOS) acceleration rate $\dot{\sigma}$. The appropriate proportionality constant can be divided into the product of the effective navigation rate N times the relative missile to target closing velocity $V_c$ yielding $$\dot{\alpha}_c = N V_c \dot{\sigma} \tag{1}$$

Two decades later, the quasi-optimality of the PRONAV algorithm was demonstrated, see Bryson, A. E. and Ho, Y. C., *Applied Optimal Control*, Blaisdell Publishing Company, Waltham Mass., 1969. The prefix quasi is used to describe PRONAV optimality because of the assumptions required in deriving PRONAV as a solution of a linear-quadratic optimal control problem, see the United States Air Force publication by Riggs, T. L. and Vergez, P. L., "Advanced Air-to-Air Missile Guidance Using Optimal Control and Estimation," AFATL-TR-81-56, Air Force Armament Directorate of Wright Laboratory, Eglin AFB FL, June 1981. These assumptions are as follows:

1. The target has zero acceleration.
2. The missile has perfect response and complete control of its acceleration vector.
3. The missile is launched on a near collision course such that the LOS angles remain small over the entire engagement.
4. The missile has zero acceleration along the LOS vector over all time.

In order to remove the first assumption, an additional term is added to the basic PRONAV algorithm in an attempt to account for target acceleration. The additional term is simply the target's estimated linear acceleration, $\alpha_T$, multiplied by a gain, $g_3$. In order to remove the fourth assumption, another term, $\alpha_M$, is sometimes included which attempts to compensate for the missile's acceleration. The resulting guidance law, known as "augmented PRONAV", appears in its most general form as $$\alpha_c = N V_c \dot{\sigma} + g_3(t_{go})\alpha_T + g_4(t_{go})\alpha_M \tag{2}$$

where $\alpha_T$ is target acceleration, $\alpha_M$ is missile acceleration and $g_3$ and $g_4$ are functions of $t_{go}$, which is the time remaining, or time-to-go, until impact or detonation.

Using equation (2) and the small line-of-sight angle assumption, assumption 3 above, the additional augmented PRONAV relationship $$\alpha_c = g_1(t_{go})y + g_2(t_{go})\dot{y} + g_3(t_{go})\alpha_T + g_4(t_{go})\alpha_M \tag{3}$$

can be derived, where y is relative position and $\dot{y}$ is relative velocity, with $g_1 = N/t_{go}^2$ and $g_2 = N/t_{go}$.

Over the past twenty-five years, numerous linear-quadratic optimal control algorithms have been posed attempting to improve upon the augmented PRONAV of equations (2) and (3) and to determine "optimal" values for the gains $g_1$, $g_2$, $g_3$ and $g_4$ (see for example Lin, C. V., *Modem Navigation, Guidance, and Control Processing*, Prentice Hall, Englewood Cliffs N.J., 1991, Chapter 8). These linear quadratic formulations have typically been based on Cartesian-based target motion models and notably the resulting guidance law solutions all require knowledge of the time-to-go quantity.

There are two disadvantages associated with the resulting guidance law or algorithm. The first disadvantage is that the states in a Cartesian-based target motion model are nonlinearly related to seeker measurements, which are spherical-based quantities such as range, range rate, and azimuth and elevation angles. Thus, there is a certain amount of incompatibility between seeker measurements and the target motion model. The second disadvantage is the requirement to estimate time-to-go, i.e., $t_{go}$. A consistently accurate estimate of $t_{go}$ cannot be obtained in a maneuvering target scenario since it depends upon the target's future motion which is unknown.

In order to make the target state estimator more compatible with seeker measurements and overcome the first disadvantage, a spherical-based nonlinear intercept kinematics model has been developed by the present inventor and several colleagues. See the publication by D'Souza, C. N., McClure, M. A., and Cloutier, J. R., "Spherical Target State Estimators," Proceedings of the American Control Conference, Baltimore Md., June 1994. Moreover in the above referenced U.S. Pat. No. 6,064,332 the need for $t_{go}$ estimation was eliminated in the development of guidance laws known as "proportional guidance" (PROGUIDE) and "augmented proportional guidance" (Augmented PROGUIDE). However, these PROGUIDE guidance laws are not based on nonlinear intercept kinematics and do not command flight path angle rate or linear acceleration. Instead, they are based on a simple linear model of the intercept and command flight path angle acceleration.

Subsequently, and as is disclosed in the above referenced and copending patent (S.I.R) application Ser. No. 08/753,754, filed Nov. 29, 1996, and in the technical paper by the present inventor, i.e., the paper of Cloutier, J. R., "Adaptive Matched Augmented Proportional Navigation," presented at the AIAA Missile Sciences Conference, Monterey Calif., November 1994, two improved "time-to-go-less guidance laws" (i.e., guidance algorithms free of the time-to-go parameter estimate) were developed. These subsequent algorithms are based on the nonlinear spherical-based intercept kinematics model disclosed in the above D'Souza, C. N., McClure, M. A., and Cloutier, J. R. publication. Furthermore, it has been demonstrated in six degrees-of-freedom simulations that these guidance laws yield superior performance over even the augmented proportional navigation algorithm. However, these subsequent guidance laws do not account for the cross-channel couplings that exist between the azimuth and elevation guidance channels. Such accounting is however considered in the present invention. The present invention therefore provides additional improvement over the augmented PRONAV guidance algorithm.

SUMMARY OF THE INVENTION

The present invention therefore provides an air to air homing missile guidance algorithm having output characteristics resembling the classic proportional navigation, i.e. PRONAV, algorithm but including additional fuel saving and real world conditions-accommodating characteristics. The guidance algorithm is based on a state-dependent Riccati equation approach to a nonlinear spherical coordinate described intercept kinematic problem, includes consideration of cross-channel coupling and is free of the time-to-go estimation requirement.

It is an object of the present invention therefore to provide an improved guidance algorithm for an airborne homing missile.

It is another object of the invention to provide a seeker missile guidance arrangement improved over the traditional proportional navigation arrangement and the augmented proportional navigation arrangement.

It is another object of the invention to provide a missile homing guidance arrangement capable of accommodating significant real world operating conditions.

It is another object of the invention to provide an airborne missile homing guidance arrangement having asymptotic similarity to the proportional navigation algorithm but additionally capable of stabilizing missile intercept kinematics in the presence of target and missile accelerations and cross-channel signal couplings.

It is another object of the invention to provide a missile homing guidance arrangement capable of accommodating conditions including accelerations, significant angular errors and homing data nonlinearities.

It is another object of the invention to provide an airborne missile homing guidance arrangement involving systematic stabilization of a general time-invariant nonlinear system.

It is another object of the invention to provide an airborne missile homing guidance arrangement in which beneficial nonlinearity effects are retained and used to advantage.

It is another object of the invention to provide an airborne missile homing guidance arrangement accommodating spherical coordinate motion modeling, an accommodation without additional nonlinearity introduction.

It is another object of the invention to provide an airborne missile homing guidance arrangement characterizable as an infinite-horizon, time-invariant nonlinear regulation algorithm.

It is another object of the invention to provide an airborne missile homing guidance arrangement employing a state-dependent Riccati equation sourced guidance algorithm.

It is another object of the invention to provide an improved airborne missile homing guidance arrangement free of a time-to-go estimation requirement.

It is another object of the invention to provide an airborne missile homing guidance arrangement in which missile to target range and range rate appear in algorithm gain coefficients in lieu of a time-to-go estimation.

It is another object of the invention to provide an airborne missile homing guidance arrangement in which azimuth and elevation cross-channel coupling effects can be accommodated.

It is another object of the invention to increase the single-shot kill probability of a tactical guided airborne weapon through use of an improved weapon guidance algorithm.

It is another object of the invention to provide an airborne missile homing guidance arrangement in which indirect minimization of missile miss distance is accomplished.

It is another object of the invention to provide a missile guidance algorithm maintaining the total nonlinear fidelity of a nonlinear kinematics problem while also employing state equation terms that are free of time-to-go related gain coefficients.

Additional objects and features of the invention will be understood from the following description and claims and the accompanying drawings.

These and other objects of the invention are achieved by the method of guiding a homing missile to a maneuvering airborne target, the method comprising the steps of:

bringing said missile within seeker range of said target;

determining flight path azimuth and elevation rates for said missile using an embodied guidance algorithm having target-related, missile-related, and relative target/missile related state terms;

said algorithm including target acceleration, missile velocity, missile acceleration and line-of-sight rate state terms in each of an azimuth signal channel equation and an elevation signal channel equation;

said algorithm also including azimuth signal channel and elevation signal cross-channel coupling-related terms;

generating new flight path azimuth and elevation rates for said missile in response to successive updating changes in said target acceleration, missile velocity, missile acceleration, line-of-sight rate and cross-channel coupling-related algorithm terms;

said generating step including determining new flight path azimuth and elevation rates for said missile following disturbance of a guidance process by either of target maneuvering and missile maneuvering accelerations;

repeating said generating step at selected intervals until said missile is deemed sufficiently close to said target for effective detonation.

DETAILED DESCRIPTION

Figure 1:
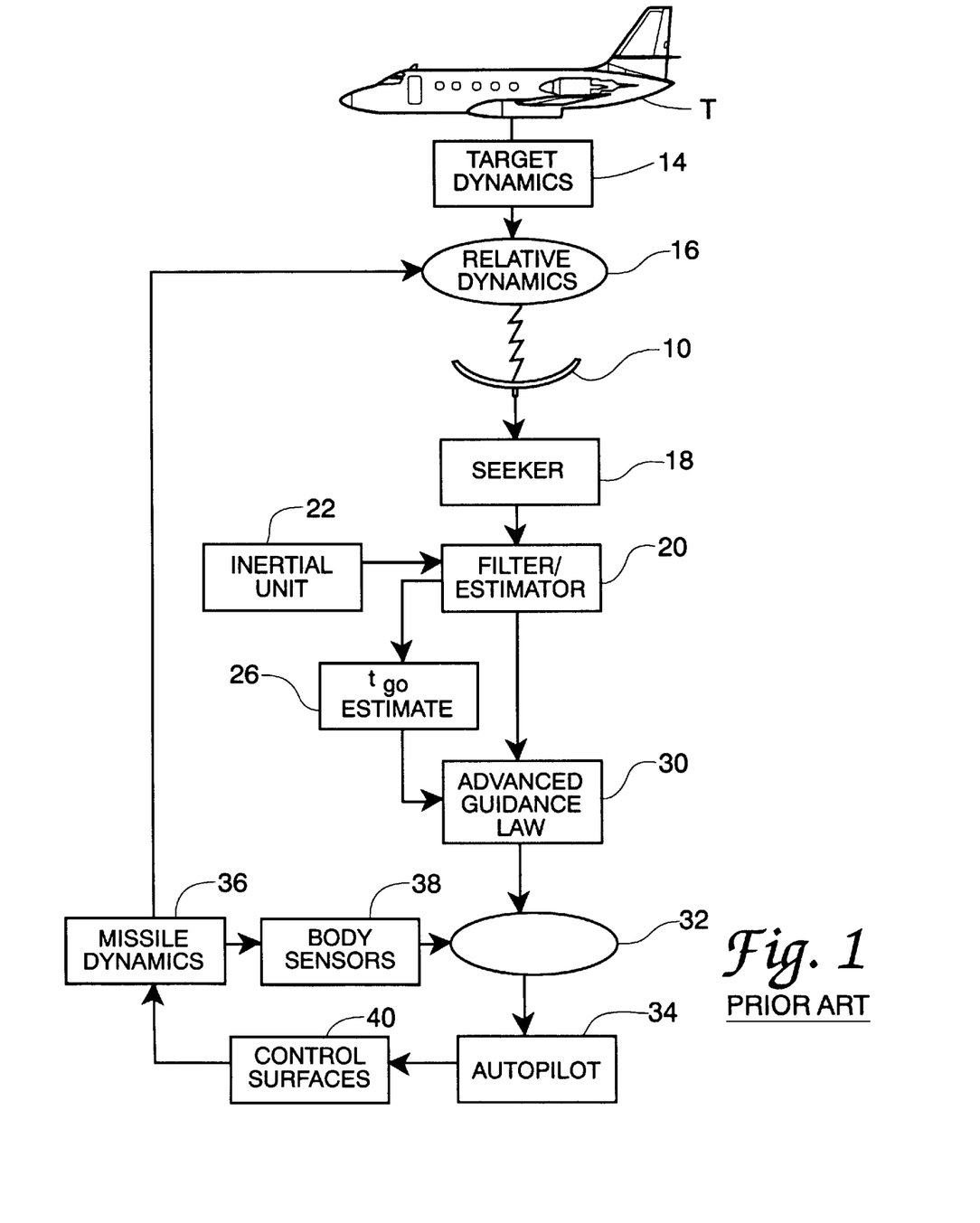
FIG. 1 shows an air-to-air missile guidance system in simplified block diagram form.

A simplified block diagram of an advanced air-to-air missile system is disclosed in each of my above incorporated by reference prior patent documents. FIG. 1 of the drawings in the present document also shows a block diagram of this type. In the FIG. 1 system the blocks and elements 10–40 are accounted for or included in the missile under consideration, a missile in pursuit of a target aircraft, T. The missile uses an active radar unit 18 having transmitter and receiver circuits coupled to an antenna 10 to track the target T. The seeker unit 18 senses the relative dynamics between the target dynamics unit 14 and the missile dynamics unit 36. Target information obtained from the seeker 18 is processed by a modem estimation filter 20, such as an extended Kalman filter, to obtain estimates of relative missile-to-target position, velocity and acceleration. These filtered estimates are dependent upon an assumed target acceleration model. Input to the filter/estimator 20 is also provided from an inertial navigation unit 22, which processes data obtained from gyroscopes and accelerometers responsive to missile maneuvering—in other words the filter/estimator 20 provides output signals or state estimates representing both target and missile maneuvering.

A guidance law based on modern control theory uses the state estimates of filter/estimator 20 and an estimate of time-to-go from block 26 until the moment of intercept in order to produce an ongoing sequence of commanded accelerations. The guidance law is implemented using a microprocessor in unit 30, with missile and target inputs from the filter/estimator 20 and the time-to-go estimator 26. Data from the guidance law unit 30 and the body sensors unit 38 are combined at block 32 and supplied to an autopilot 34. The autopilot 34 converts the commanded input into fin commands for the actuators of the control surfaces represented by block 40, based on airframe aerodynamic characteristics and sensed missile body angular rates and linear acceleration. The resulting motion produces new missile dynamics in missile dynamics unit 36, which closes the feedback loop.

Figures 2, 3:
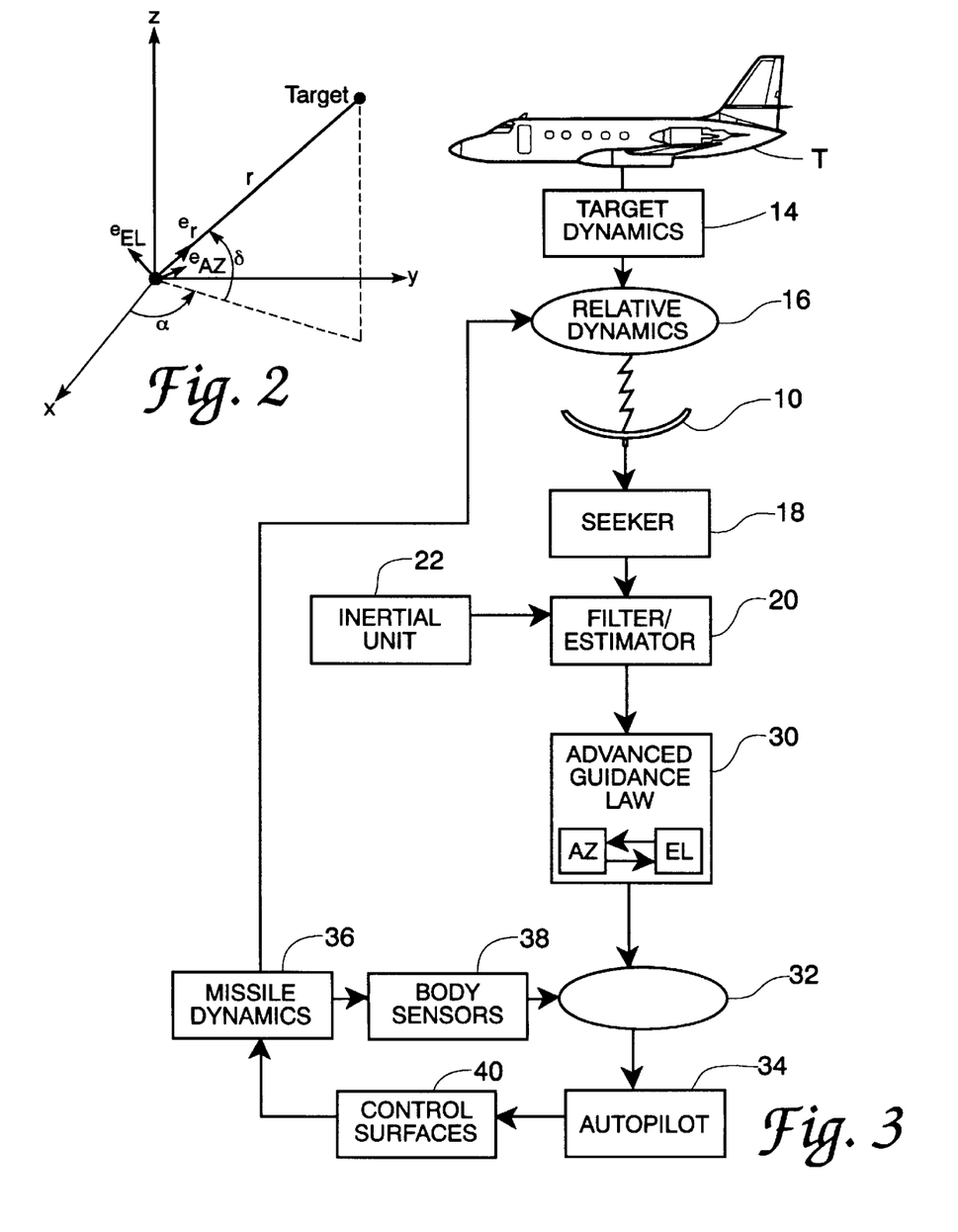
FIG. 2 shows a line-of-sight spherical coordinate frame useful in describing the inventon.
FIG. 3 shows a guidance system of the FIG. 1 type with the present invention included.

In the present invention it is desired to find the closest guidance law to the unaugmented PRONAV algorithm (e.g., as defined in equation (2) above) that is capable of asymptotically stabilizing the missile intercept kinematics in the presence of modeled target and missile accelerations and signal coupling between missile azimuth and elevation data channels. This achieved algorithm is in contrast to traditional homing guidance strategies attempting to directly minimize missile miss distance. The new algorithm also avoids the need to provide a time-to-go estimate of block 26 in FIG. 1 and results in the indirect minimization of miss distance provided the target and missile accelerations are reasonably characterized or modeled. FIG. 3 in the drawings shows a block diagram of the FIG. 1 type for a system inclusive of the present invention. In the FIG. 3 system, the time-to-go estimate of block 26 in FIG. 1 is omitted and a guidance law inclusive of coupling between azimuth and elevation signal channels is indicated in the guidance law representation of block 30.

The guidance formulation resulting from the new strategy involves what may be classified as an infinite-horizon, time-invariant, nonlinear regulator problem. A little known technique for systematically designing nonlinear regulators, the state-dependent Riccati equation (SDRE) method, is then used to produce a locally asymptotically stabilizing feedback solution of the problem. Additional information regarding the Riccati equation method is to be found in the published article of Cloutier, J. R., D'Souza, C. N., and Mracek, C. P., "Nonlinear Regulation and Nonlinear $H_\infty$ Control Via the State-Dependent Riccati Equation Technique: Part 1, Theory; Part 2, Examples," Proceedings of the 1st International Conference on Nonlinear Problems in Aviation and Aerospace, Daytona Beach Fla., May 1996. The contents of this article are also hereby incorporated by reference herein.

The $t_{go}$-less guidance laws of the present invention take various levels of cross-channel couplings into account. For completeness, the zero coupling or decoupled versions of these guidance laws are also disclosed herein. These decoupled guidance laws are in fact the guidance laws developed in the publication of Cloutier, J. R., "Adaptive Matched Augmented Proportional Navigation," presented at the AIAA Missile Sciences Conference, Monterey Calif., November 1994. Thus, the guidance laws presented in the related Air Force-assigned and above-identified Ser. No. 08/753,754, filed Nov. 29, 1996, patent (S.I.R.) document are also a special case of the guidance laws presented herein and are obtained by setting the herein included cross-channel coupling parameters to zero.

NONLINEAR SPHERICAL INTERCEPT KINEMATICS MODEL

The spherical target state intercept kinematics model developed in the above identified publication of D'Souza, C. N., McClure, M. A. and Cloutier, J. R., "Spherical Target State Estimators," Proceedings of the American Control Conference, Baltimore Md., June 1994 is derived in the line-of-sight frame using Newton's Second Law. The line-of-sight frame is a rotating frame centered at the missile and defined relative to the translating but nonrotating xyz-missile frame. It is described by the three unit vectors $e_r$, $e_{AZ}$, $e_{EL}$ as is shown in FIG. 2 of the drawings herein.

The subscripts r, AZ and EL in these unit vectors and other mathematical symbols herein refer to range, azimuth and elevation, respectively. The vector $e_r$ is aligned with the line-of-sight vector; the vector $e_{AZ}$ is obtained by crossing $e_r$ into a unit vector lying along the projection of $e_r$ onto the xy-plane; the vector $e_{EL}$ is obtained from the cross product of $e_r$ and $e_{AZ}$. All quantities in the model come from inertial vectors which have been instantaneously resolved in the line-of-sight frame. The model contains the following azimuth rate and elevation rate equations describing the angular kinematics of the line-of-sight vector:

$$\dot{a} = \frac{\dot{\sigma}_{AZ}}{\cos\delta} \tag{4}$$

$$\ddot{\sigma}_{AZ} = \frac{a_{T_{AZ}} - a_{M_{AZ}}}{r} + \frac{2V_C \dot{\sigma}_{AZ}}{r} - \dot{\sigma}_{AZ}\dot{\sigma}_{EL}\tan\delta \tag{5}$$

$$\dot{\delta} = -\dot{\sigma}_{EL} \tag{6}$$

$$\ddot{\sigma}_{EL} = -\frac{a_{T_{EL}} - a_{M_{EL}}}{r} + \frac{2V_C \dot{\sigma}_{EL}}{r} + \dot{\sigma}_{AZ}^2\tan\delta \tag{7}$$

where $\dot{\sigma}_{AZ}\dot{\sigma}_{EL}$ and $\dot{\sigma}_{AZ}$ and $\dot{\sigma}_{EL}$ are the inertial line-of-sight rates about the $e_{EL}$ and $e_{AZ}$ axes, respectively.

The missile's velocity vector is associated with a rotating coordinate wind frame. Hence, the missile's inertial acceleration can be expanded into the form $\omega \times \upsilon + \dot{\upsilon}$, where $\omega$ is the inertial flight path angle rate. These quantities can then be instantaneously resolved into the line-of-sight frame. Expanding equations (5) and (7) in this manner leads to the desired nonlinear kinematics model $$\dot\sigma_{AZ} = \frac{1}{r}a_{T_{AZ}} - \frac{1}{r}\left[V_{M_r}\omega_{AZ} + \dot V_{M_{AZ}} - \omega_r V_{M_{EL}}\right] + \frac{V_{M_r}}{r}\left[\frac{2V_c}{V_{M_r}}\right]\dot\sigma_{AZ} + (\dot\sigma_{AZ}\tan\sigma_{EL})\dot\sigma_{EL} \quad (8)$$

$$\dot\sigma_{EL} = -\frac{1}{r}a_{T_{EL}} + \frac{1}{r}\left[V_{M_r}(-\omega_{EL}) + \dot V_{M_{EL}} + \omega_r V_{M_{AZ}}\right] + \frac{V_{M_r}}{r}\left[\frac{2V_c}{V_{M_r}}\right]\dot\sigma_{EL} - (\dot\sigma_{AZ}\tan\sigma_{EL})\dot\sigma_{AZ} \quad (9)$$

where $\omega_r$, $\omega_{AZ}$, $\omega_{EL}$ are the angular rate components of the missile's velocity vector about the $e_r, e_{EL}, e_{AZ}$ axes, respectively, $V_{M_r}, V_{M_{AZ}}, V_{M_{EL}}$ are the components of the missile's velocity vector along the $e_r$, $e_{AZ}$, $e_{EL}$ axes, respectively, and $\dot V_{M_{AZ}}$ and $\dot V_{M_{EL}}$ are the components of the missile's inertial acceleration along the $e_{AZ}$ and $e_{AL}$ axes, respectively. Note that the azimuth and elevation equations (8) and (9) are decoupled with respect to cross-channel signal coupling when the two coupling parameters $\omega_r$ and $c_3 = \dot\sigma_{AZ} \tan \sigma_{EL}$ are both zero.

To complete the kinematics model, target acceleration is modeled as a first order process, as it is in the spherical-based target state estimator of the D'Souza, C. N., McClure, M. A., and Cloutier, J. R., "Spherical Target State Estimators," Proceedings of the American Control Conference, Baltimore Md., June 1994 publication, while missile acceleration is modeled as constant. This yields $$\dot a_{T_{AZ}} = -\lambda_{AZ} a_{T_{AZ}} \quad (10)$$

$$\dot a_{T_{EL}} = -\lambda_{EL} a_{T_{EL}} \quad (11)$$

$$\ddot V_{M_{AZ}} = 0 \quad (12)$$

$$\ddot V_{M_{EL}} = 0 \quad (13)$$

The latter modeling assumption is not restrictive since the missile acceleration will be updated from the onboard inertial navigation system every guidance cycle. Thus, in implementation, the missile acceleration will be processed in the adaptive guidance algorithm as if it were piecewise constant over small time spans.

THE PRESENT INVENTION GUIDANCE STRATEGY

For the new guidance strategy, it is instructive to first consider an azimuth plane intercept scenario where the missile employs the angular version of unaugmented PRONAV, i.e., $$\omega_{AZ} = K_2 \dot\sigma_{AZ} \quad (14)$$

$$= \frac{NV_c}{V_{M_r}}\dot\sigma_{AZ} \quad (15)$$

where N is $$\frac{V_{M_r}}{K_2 V_c},$$

the effective navigation ratio and $V_c$ is the closing velocity. Since the intercept is planar, equation (8) reduces to $$\dot\sigma_{AZ} = -\frac{V_{M_r}}{r}\left[\omega_{AZ} - \frac{2V_c}{V_{M_r}}\dot\sigma_{AZ}\right] + \frac{1}{r}\left[a_{T_{AZ}} - \dot V_{M_{AZ}}\right] \quad (16)$$

Substituting equation (15) into equation (16) yields $$\dot\sigma_{AZ} = -\frac{(N-2)V_c}{r}\dot\sigma_{AZ} + \frac{1}{r}\left[a_{T_{AZ}} - \dot V_{M_{AZ}}\right] \quad (17)$$

If $\alpha_{T_{AZ}}$ and $\dot V_{M_{AZ}}$ are zero, then the solution of the unforced kinematics is given by $$\dot\sigma_{AZ}(t) = e^{-\int_{t_0}^{t}\frac{N-2}{r(\tau)}V_c(\tau)d\tau}\dot\sigma_{AZ}(t_0) \quad (18)$$

which is asymptotically stable (i.e., $\dot\sigma_{AZ}(t) \to 0$ as $t \to \infty$) as long as the effective navigation ratio is greater than two. When the target or missile accelerates along $e_{AZ}$, the forcing term, $$\frac{1}{r}\left[a_{T_{AZ}} - \dot V_{M_{AZ}}\right],$$

in equation (17) can destabilize the kinematics resulting in an unsuccessful intercept.

Using the new guidance strategy, we seek the closest guidance law to unaugmented PRONAV that is able to asymptotically stabilize the intercept kinematics in a deterministic maneuvering target scenario. This leads to the following infinite-horizon, time-invariant, nonlinear regulator problem: Minimize $$J = \frac{1}{2}\int_{t_0}^{\infty}\left(\dot\sigma_{AZ} - \frac{\omega_{AZ}}{K_2}\right)^2 + \left(\dot\sigma_{EL} - \frac{\omega_{EL}}{K_2}\right)^2 dt \quad (19)$$

$$\chi^T = [\dot\sigma_{AZ}\dot\sigma_{EL}a_{T_{AZ}}a_{T_{EL}}V_{M_{AZ}}V_{M_{EL}}\dot V_{M_{AZ}}\dot V_{M_{EL}}]^T \quad (20)$$

$$u^T = [\omega_{AZ}\omega_{EL}]^T \quad (21)$$

the nonlinear regulator problem can be rewritten as $$J = \frac{1}{2}\int_{t_0}^{\infty} x^T Q(x)x + 2x^T S(x)u + u^T R(x)u\, dt \quad (22)$$

subject to nonlinear kinematics of the form $$\dot\chi = f(\chi) + B(\chi)u \quad (23)$$

For this particular problem, Q, R and S are not functions of the state.

THE STATE-DEPENDENT RICCATI EQUATION METHOD

The state-dependent Riccati equation approach for obtaining a suboptimal locally asymptotically stabilizing solution of the problem defined in equations (22) and (23) is:

i) Use direct parameterization to bring the nonlinear dynamics of equation (23) to the state-dependent coefficient form $$\dot\chi = A(\chi)\chi + B(\chi)u \quad (24)$$

ii) Solve the state-dependent Riccati equation $$[A-BR^{-1}S^T]^T P + P[A-BR^{-1}S^T] - PBR^{-1}B^T P + Q - SR^{-1}S^T = 0 \quad (25)$$

to obtain $P \geq 0$. Note that P is a function of x, i.e., a function of the states of the system as given by equation (20);

iii) Construct the nonlinear feedback controller via $$u = -R^{-1}(x)[B^T(x)P(x) + S^T(x)]x \quad (26)$$

It was shown in the above identified publication of Cloutier, J. R., D'Souza, C. N., and Mracek, C. P., "Nonlinear Regulation and Nonlinear $H_\infty$ Control Via the State-Dependent Riccati Equation Technique: Part 1, Theory; Part 2, Examples," Proceedings of the 1st International Conference on Nonlinear Problems in Aviation and Aerospace, Daytona Beach Fla., May 1996 that there are an infinite number of ways to bring the nonlinear system to the state dependent coefficient form of equation (24). The state dependent coefficient parameterization chosen here is $$A(x) = \begin{bmatrix} c_1 K_1 & c_3 & c_2 & 0 & 0 & c_2\omega_r & -c_2 & 0 \\ -c_3 & c_1 K_1 & 0 & -c_2 & c_2\omega_r & 0 & 0 & c_2 \\ 0 & 0 & -\lambda_{AZ} & 0 & 0 & 0 & 0 & 0 \\ 0 & 0 & 0 & -\lambda_{EL} & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{bmatrix} \quad (27)$$

with $$B(x) = \begin{bmatrix} -c_1 & 0 \\ 0 & -c_1 \\ 0 & 0 \\ 0 & 0 \\ 0 & 0 \\ 0 & 0 \\ 0 & 0 \\ 0 & 0 \end{bmatrix} \quad (28)$$

The parameters in equations (27) and (28) are given by relationships $$c_1 = \frac{V_{M_r}}{r} \quad (29)$$

$$c_2 = \frac{1}{r}$$

$$K_1 = \frac{2V_c}{V_{M_r}}$$

$$c_3 = \dot{\sigma}_{AZ} \tan \sigma_{EL}$$

ADAPTIVE MATCHED AUGMENTED PRONAV

The approximate solution of the guidance problem of equations (22) and (23) has been obtained analytically by solving the Riccati equation (25) symbolically using the software package Macsyma, which is available from Macsyma, Inc. currently in the version 418 or later. There are in fact four guidance laws contained in the guidance solution of equations (22) and (23) relating to the four different cross-channel coupling cases of: ($\omega_r=0$, $c_3=0$), ($\omega_r=0$, $c_3\neq 0$), ($\omega_r\neq 0$, $c_3=0$), and ($\omega_r\neq 0$, $c_3\neq 0$). These guidance laws are referred to by the name "adaptive matched augmented angular PRONAV" (AMAAP). The guidance laws are adaptive since estimates of the parameters in equation (29) are supplied by the missile onboard inertial navigation system and the target state estimator and are updated every guidance cycle. "Matched" is used in this name to indicate the guidance laws are matched to the nonlinear kinematics of the intercept since the kinematics were imposed as constraints in the guidance formulation. "Angular" in this name refers to the guidance laws commanding flight path angle rate. Finally, the nonlinear guidance solution can be converted to command linear acceleration; this leads to another set of four guidance laws which are referred to as "adaptive matched augmented linear PRONAV" (AMALP). It should be emphasized that the descriptor "linear" refers to what is being commanded, i.e., linear acceleration, and not to the guidance laws which are nonlinear. The AMAAP guidance laws are defined by the following equations (30) through (37) for the indicated differing cross-channel coupling cases.

Case 1: $\omega_r \neq 0$, $c_3 \neq 0$ (Cross-Channel Coupling Present)

Azimuth Channel $$\omega_{AZ} = (2K_1 - K_2)\dot{\sigma}_{AZ} + \quad (30)$$

$$\frac{2c_2(K_1-K_2)[\lambda_{AZ}+c_1(K_1-K_2)]}{[\lambda_{AZ}+c_1(K_1-K_2)]^2+c_3^2} a_{T_{AZ}} +$$

$$\frac{2c_2 c_3(K_1-K_2)}{[\lambda_{EL}+c_1(K_1-K_2)]^2+c_3^2} a_{T_{EL}} -$$

$$\frac{2c_2 c_3 \omega_r(K_1-K_2)}{c_1^2(K_1-K_2)^2+c_3^2} V_{M_{AZ}} + \frac{2c_1 c_2 \omega_r(K_1-K_2)^2}{c_1^2(K_1-K_2)^2+c_3^2} V_{M_{EL}} -$$

$$\frac{2c_1 c_2(K_1-K_2)^2 [c_1^2(K_1-K_2)^2 + c_3(2\omega_r+c_3)]}{[c_1^2(K_1-K_2)^2+c_3^2]^2} \dot{V}_{M_{AZ}} -$$

$$2c_2(K_1-K_2)[\omega_r\{-c_1^2(K_1-K_2)^2+c_3^2\}+$$

$$\frac{c_3\{c_1^2(K_1-K_2)^2+c_3^2\}]}{[c_1^2(K_1-K_2)^2+c_3^2]^2} \dot{V}_{M_{EL}}$$

Elevation Channel $$\omega_{EL} = (2K_1 - K_2)\dot{\sigma}_{EL} - \quad (31)$$

$$\frac{2c_2(K_1-K_2)[\lambda_{EL}+c_1(K_1-K_2)]}{[\lambda_{EL}+c_1(K_1-K_2)]^2+c_3^2} a_{T_{EL}} +$$

$$\frac{2c_2 c_3(K_1-K_2)}{[\lambda_{AZ}+c_1(K_1-K_2)]^2+c_3^2} a_{T_{AZ}} +$$

$$\frac{2c_2 c_3 \omega_r(K_1-K_2)}{c_1^2(K_1-K_2)^2+c_3^2} V_{M_{EL}} + \frac{2c_1 c_2 \omega_r(K_1-K_2)^2}{c_1^2(K_1-K_2)^2+c_3^2} V_{M_{AZ}} \dot{V}_{M_{EL}} +$$

$$\frac{2c_1 c_2(K_1-K_2)^2 [c_1^2(K_1-K_2)^2 + c_3(2\omega_r+c_3)]}{[c_1^2(K_1-K_2)^2+c_3^2]^2} \dot{V}_{M_{EL}} -$$

$$2c_2(K_1-K_2)[\omega_r\{-c_1^2(K_1-K_2)^2+c_3^2\}+$$

$$\frac{c_3\{c_1^2(K_1-K_2)^2+c_3^2\}]}{[c_1^2(K_1-K_2)^2+c_3^2]^2} \dot{V}_{M_{AZ}}$$

The first parenthetic expression and each fractional expression in these equations may be referred to as a gain coefficient. Moreover, these gain coefficients may be identified by way of counting between a first coefficient and a seventh coefficient for each equation.

Case 2: $\omega_r=0$, $c_3\neq 0$ (Cross-Channel Coupling Present)

Notably in this and each of the other equations (32) through (37) certain terms appearing in equations (30) and (31) are absent because of the zero value of one or more cross coupling coefficients.

Azimuth Channel $$\omega_{AZ} = (2K_1 - K_2)\dot{\sigma}_{AZ} + \tag{32}$$

$$\frac{2c_2(K_1 - K_2)[\lambda_{AZ} + c_1(K_1 - K_2)]}{([\lambda_{AZ} + c_1(K_1 - K_2)])^2 + c_3^2} a_{T_{AZ}} +$$

$$\frac{2c_2c_3(K_1 - K_2)}{([\lambda_{EL} + c_1(K_1 - K_2)])^2 + c_3^2} a_{T_{EL}} -$$

$$\frac{2c_1c_2(K_1 - K_2)^2}{c_1^2(K_1 - K_2)^2 + c_3^2}\dot{V}_{M_{AZ}} - \frac{2c_2c_3(K_1 - K_2)}{c_1^2(K_1 - K_2)^2 + c_3^2}\dot{V}_{M_{EL}}$$

Elevation Channel $$\omega_{EL} = (2K_1 - K_2)\dot{\sigma}_{EL} + \tag{33}$$

$$\frac{2c_2c_3(K_1 - K_2)}{([\lambda_{AZ} + c_1(K_1 - K_2)])^2 + c_3^2} a_{T_{AZ}} -$$

$$\frac{2c_2(K_1 - K_2)[\lambda_{EL} + c_1(K_1 - K_2)]}{[\lambda_{EL} + c_1(K_1 - K_2)]^2 + c_3^2} a_{T_{EL}} -$$

$$\frac{2c_2c_3(K_1 - K_2)}{c_1^2(K_1 - K_2)^2 + c_3^2}\dot{V}_{M_{AZ}} + \frac{2c_1c_2(K_1 - K_2)^2}{c_1^2(K_1 - K_2)^2 + c_3^2}\dot{V}_{M_{EL}}$$

Case 3: $\omega_r \neq 0$, $C_3 = 0$ (Cross-Channel Coupling Present)

Azimuth Channel $$\omega_{AZ} = (2K_1 - K_2)\dot{\sigma}_{AZ} + \frac{2c_2(K_1 - K_2)}{\lambda_{AZ} + c_1(K_1 - K_2)} a_{T_{AZ}} + \tag{34}$$

$$\frac{2c_2\omega_r}{c_1}V_{M_{EL}} - \frac{2c_2}{c_1}\dot{V}_{M_{AZ}} + \frac{2c_2\omega_r}{c_1^2(K_1 - K_2)}\dot{V}_{M_{EL}}$$

Elevation Channel $$\omega_{EL} = (2K_1 - K_2)\dot{\sigma}_{EL} - \frac{2c_2(K_1 - K_2)}{\lambda_{EL} + c_1(K_1 - K_2)} a_{T_{EL}} + \tag{35}$$

$$\frac{2c_2\omega_r}{c_1}V_{M_{AZ}} + \frac{2c_2}{c_1}\dot{V}_{M_{EL}} + \frac{2c_2\omega_r}{c_1^2(K_1 - K_2)}\dot{V}_{M_{AZ}}$$

Case 4: $\omega_r = 0$, $c_3 = 0$ (No Cross-Channel Coupling Present)

Notably in this case a greatest number of the terms appearing in equations (30) and (31) are absent because of the zero value of both cross coupling coefficients.

Azimuth Channel $$\omega_{AZ} = 2K_1 - K_2\dot{\sigma}_{AZ} + \left[\frac{2c_2(K_1 - K_2)}{\lambda_{AZ} + c_1(K_1 - K_2)}\right]a_{T_{AZ}} - \tag{36}$$

$$\left[\frac{2c_2}{c_1}\right]\dot{V}_{M_{AZ}}$$

Elevation Channel $$\omega_{EL} = 2K_1 - K_2\dot{\sigma}_{EL} - \left[\frac{2c_2(K_1 - K_2)}{\lambda_{EL} + c_1(K_1 - K_2)}\right]a_{T_{EL}} + \tag{37}$$

$$\left[\frac{2c_2}{c_1}\right]\dot{V}_{M_{EL}}$$

The angular rates of change of the flight path, $\omega_{AZ}$ and $\omega_{EL}$, which are commanded by adaptive matched augmented angular PRONAV, adaptive matched augmented angular PRONAV, in the LOS frame, can be transformed to the inertial frame to produce flight path angle rate commands. After computing $$\begin{bmatrix} \omega_x \\ \omega_y \\ \omega_z \end{bmatrix} = T_{LOS}^I \begin{bmatrix} 0 \\ \omega_{EL} \\ \omega_{AZ} \end{bmatrix} \tag{38}$$

where $T_{LOS}^{\ 1}$ is the transformation from the line-of-sight frame to the inertial frame. The commanded flight path angle rates $\dot{\gamma}$ and $\dot{\chi}$ are given by $$\dot{\gamma} = \text{sign}\left(\begin{bmatrix} \omega_x \\ \omega_y \end{bmatrix} \cdot \begin{bmatrix} -\sin\chi \\ \cos\chi \end{bmatrix}\right)\sqrt{\omega_x^2 + \omega_y^2} \tag{39}$$

and $$\dot{\chi} = \omega_z \tag{40}$$

where $\chi$ is the horizontal flight path angle and $[-\sin\chi, \cos\chi]^T$ is a unit vector about which $\dot{\gamma}$ is acting.

Adaptive matched augmented angular PRONAV achieves a significant level of system integration between the guidance law and the target state estimator. Furthermore, since an autopilot is basically an angular controller, a high degree of system integration can be achieved between the angular guidance law and the autopilot through the development of angular-based autopilot command logic. In the angular-based logic, the commanded flight path angle rates can be linearly related to the autopilot's inner loop body rate commands.

To convert the adaptive matched augmented angular PRONAV, AMAAPP, guidance laws of equations (30) through (37) to command linear acceleration, both sides of the equations may be multiplied by $V_{M_r}$ or by the equivalent of $V_{M_r}$ as defined in the relationships appearing in equation (29) above. Additionally, the elevation equations are multiplied by $-1$ since, in the way the line-of-sight frame has been defined, a positive $\omega_{EL}$ produces a negative $\alpha_{M_{EL}}$. Doing so leads to the adaptive matched augmented linear PRONAV, AMALP, guidance laws recited in the following equations (41) through (48) for the cross coupling conditions listed.

Case 1: $\omega_r \neq 0$, $c_3 \neq 0$ (Cross-Channel Coupling Present)

Azimuth Channel $$a_{AZ} = (2K_1 - K_2)V_{M_r}\dot{\sigma}_{AZ} + \tag{41}$$

$$\frac{2c_1(K_1 - K_2)[\lambda_{AZ} + c_1(K_1 - K_2)]}{[\lambda_{AZ} + c_1(K_1 - K_2)]^2 + c_3^2} a_{T_{AZ}} +$$

$$\frac{2c_1c_3(K_1 - K_2)}{[\lambda_{EL} + c_1(K_1 - K_2)]^2 + c_3^2} a_{T_{EL}} -$$

$$\frac{2c_1c_3\omega_r(K_1 - K_2)}{c_1^2(K_1 - K_2)^2 + c_3^2}V_{M_{AZ}} + \frac{2c_1^2\omega_r(K_1 - K_2)^2}{c_1^2(K_1 - K_2)^2 + c_3^2}V_{M_{EL}} -$$

$$\frac{2c_1^2(K_1 - K_2)^2\left[c_1^2(K_1 - K_2)^2 + c_3(2\omega_r + c_3)\right]}{\left[c_1^2(K_1 - K_2)^2 + c_3^2\right]^2}\dot{V}_{M_{AZ}} -$$

$$\frac{2c_1(K_1 - K_2)[\omega_r\{-c_1^2(K_1 - K_2)^2 + c_3^2\} + c_3\{c_1^2(K_1 - K_2)^2 + c_3^2\}]}{\left[c_1^2(K_1 - K_2)^2 + c_3^2\right]^2}\dot{V}_{M_{EL}}$$

Elevation Channel $$a_{EL} = -(2K_1 - K_2)V_{M_r}\dot{\sigma}_{EL} + \quad (42)$$
$$\frac{2c_1(K_1 - K_2)[\lambda_{EL} + c_1(K_1 - K_2)]}{[\lambda_{EL} + c_1(K_1 - K_2)]^2 + c_3^2}a_{T_{EL}} -$$
$$\frac{2c_1c_3(K_1 - K_2)}{[\lambda_{AZ} + c_1(K_1 - K_2)]^2 + c_3^2}a_{T_{AZ}} -$$
$$\frac{2c_1c_3\omega_r(K_1 - K_2)}{c_1^2(K_1 - K_2)^2 + c_3^2}V_{M_{EL}} - \frac{2c_1^2\omega_r(K_1 - K_2)^2}{c_1^2(K_1 - K_2)^2 + c_3^2}V_{M_{AZ}} -$$
$$\frac{2c_1^2(K_1 - K_2)^2[c_1^2(K_1 - K_2)^2 + c_3(2\omega_r + c_3)]}{[c_1^2(K_1 - K_2)^2 + c_3^2]^2}\dot{V}_{M_{EL}} +$$
$$\frac{2c_1(K_1 - K_2)[\omega_r\{-c_1^2(K_1 - K_2)^2 + c_3^2\} +}{c_3\{c_1^2(K_1 - K_2)^2 + c_3^2\}]}\dot{V}_{M_{AZ}}$$

Case 2: $\omega_r=0$, $c_3\neq 0$ (Cross-Channel Coupling)

Azimuth Channel $$a_{AZ} = (2K_1 - K_2)V_{M_r}\dot{\sigma}_{AZ} + \quad (43)$$
$$\frac{2c_1(K_1 - K_2)[\lambda_{AZ} + c_1(K_1 - K_2)]}{([\lambda_{AZ} + c_1(K_1 - K_2)])^2 + c_3^2}a_{T_{AZ}} +$$
$$\frac{2c_1c_3(K_1 - K_2)}{([\lambda_{EL} + c_1(K_1 - K_2)])^2 + c_3^2}a_{T_{EL}} -$$
$$\frac{2c_1c_3(K_1 - K_2)^2}{c_1^2(K_1 - K_2)^2 + c_3^2}\dot{V}_{M_{AZ}} - \frac{2c_1c_3(K_1 - K_2)}{c_1^2(K_1 - K_2)^2 + c_3^2}\dot{V}_{M_{EL}}$$

Elevation Channel $$a_{EL} = -(2K_1 - K_2)V_{M_r}\dot{\sigma}_{EL} - \quad (44)$$
$$\frac{2c_1c_3(K_1 - K_2)}{([\lambda_{AZ} + c_1(K_1 - K_2)])^2 + c_3^2}a_{T_{AZ}} +$$
$$\frac{2c_1(K_1 - K_2)[\lambda_{EL} + c_1(K_1 - K_2)]}{([\lambda_{EL} + c_1(K_1 - K_2)])^2 + c_3^2}a_{T_{EL}} +$$
$$\frac{2c_1c_3(K_1 - K_2)}{c_1^2(K_1 - K_2)^2 + c_3^2}\dot{V}_{M_{AZ}} - \frac{2c_1^2(K_1 - K_2)^2}{c_1^2(K_1 - K_2)^2 + c_3^2}\dot{V}_{M_{EL}}$$

Case 3: $\omega_r\neq 0$, $c_3=0$ (Cross-Channel Coupling)

Azimuth Channel $$a_{AZ} = (2K_1 - K_2)V_{M_r}\dot{\sigma}_{AZ} + \frac{2c_1(K_1 - K_2)}{\lambda_{AZ} + c_1(K_1 - K_2)}a_{T_{AZ}} + \quad (45)$$
$$2\omega_r V_{M_{EL}} - 2\dot{V}_{M_{AZ}} + \frac{2\omega_r}{c_1(K_1 - K_2)}\dot{V}_{M_{EL}}$$

Elevation Channel $$a_{EL} = -(2K_1 - K_2)V_{M_r}\dot{\sigma}_{EL} + \frac{2c_1(K_1 - K_2)}{\lambda_{EL} + c_1(K_1 - K_2)}a_{T_{EL}} - \quad (46)$$
$$2\omega_r V_{M_{AZ}} - 2\dot{V}_{M_{EL}} - \frac{2\omega_r}{c_1(K_1 - K_2)}\dot{V}_{M_{AZ}}$$

Case 4: $\omega_r=0$, $c_3=0$ (No Cross-Channel Coupling)

Azimuth Channel $$a_{AZ} = (2K_1 - K_2)V_{M_r}\dot{\sigma}_{AZ} + \left[\frac{2c_1(K_1 - K_2)}{\lambda_{AZ} + c_1(K_1 - K_2)}\right]a_{T_{AZ}} - 2\dot{V}_{M_{AZ}} \quad (47)$$

Elevation Channel $$a_{EL} = -(2K_1 - K_2)V_{M_r}\dot{\sigma}_{EL} + \left[\frac{2c_1(K_1 - K_2)}{\lambda_{EL} + c_1(K_1 - K_2)}\right]a_{T_{EL}} - 2\dot{V}_{M_{EL}} \quad (48)$$

In implementing the AMALP guidance laws (41)–(48), the commanded accelerations $\alpha_{M_{AZ}}$ and $\alpha_{M_{EL}}$ would typically be transformed to the missile body frame via $$\begin{bmatrix} a_x \\ a_y \\ a_z \end{bmatrix} = T_{LOS}^B \begin{bmatrix} 0 \\ a_{M_{AZ}} \\ a_{M_{EL}} \end{bmatrix} \quad (49)$$

where $T_{LOS}^B$ is the transformation from the LOS frame to the missile body frame. The commanded body accelerations would then be given by $\alpha_y$ and $\alpha_z$, while $\alpha_x$, the acceleration along the body center line, would be discarded.

Cross-Channel Couplings

Reviewing the guidance laws (30)–(37) and (41)–(48), the different cross-channel couplings occurring when the coupling parameters $\omega_r$ and $c_3$ are not zero can be identified. For ($\omega r=0$, $c_3=0$), there are no cross-channel couplings and the guidance laws (36)–(37) and (47)–(48) are the guidance laws developed in [7]. For ($\omega_r\neq 0$, $c_3=0$), cross-channel missile velocity and missile acceleration enter into each of the guidance channels. The cases involving $c_3\neq 0$, are interesting. Inspection of the nonlinear kinematics (8)–(9) reveals that when $c_3\neq 0$, cross-channel line-of-sight rate enters into each channel and yet in the guidance laws (30)–(33) and (41)–(44), cross-channel line-of-sight rate is not present. This is due to the fact that $p_{12}$, the (1,2)-element of the solution matrix P of the Riccati equation (25), is zero. If this element were not zero, then cross-channel line-of-sight rate would indeed appear in the guidance laws for $c_3\neq 0$. What a nonzero $C_3$ does do, however, is to bring into the guidance laws both cross-channel target and missile acceleration. Finally, for ($\omega_r\neq 0$, $c_3\neq 0$), in addition to cross-channel missile velocity, missile acceleration and target acceleration, same channel missile velocity appears, and is only present when both of the coupling parameters are nonzero.

Effective Navigation Ratio

By allowing unaugmented PRONAV's navigation ration $K_2$ to be proportional to $K_1$, i.e., $$K_2 = \frac{K_1}{a} \quad (50)$$

a desired effective navigation ratio N can be obtained for the AMAAP and AMALP guidance laws. For $\alpha=2$, N=3, for $\alpha=4$, N=3.5, and as $\alpha\to\infty$, N→4.

Advantages and New Features

The new features of the angular and linear guidance laws disclosed here are that the algorithms (1) do not require an estimate of $t_{go}$ and (2) account for various levels of cross-channel couplings that are present in the intercept kinematics. The first feature provides a significant advantage over traditional augmented PRONAV and its modem control variants. This is due to the fact that modern homing guidance laws, which are the solutions of linear-quadratic, minimum miss distance, optimal control problems, have $t_{go}$ embedded in their gain coefficients. Therefore, in order for these guidance laws to be properly scheduled, an accurate estimate of $t_{go}$ is required. Unfortunately, this is impossible in a maneuvering target scenario, since a consistently accurate estimate of $t_{go}$ would require knowledge of future, unknown target motion. The traditional fallback position has been to estimate $t_{go}$ as $$\hat{t}_{go} = -\hat{r}/\hat{\dot{r}} \tag{51}$$

which is valid only in a constant velocity, or near constant velocity, intercept. An often used alternative is to estimate $t_{go}$ using the assumption of constant target acceleration—which in some cases may yield worse results than equation (51). Thus, the estimation of time-to-go has been one of the weakest links in the guidance and control system with regard to highly maneuvering targets.

Close inspection of the angular and linear algorithms of the present invention reveals these guidance laws have range, $r$, and range rate, $\dot{r}$, in their gain coefficients, not time-to-go. Hence, these guidance laws will be properly scheduled if accurate estimates of $r$ and $\dot{r}$ are available. In contrast, even perfect estimates of $r$ and $\dot{r}$ can produce undesirable estimates of $t_{go}$ via equation (51). The implication of this is that the angular and linear guidance laws of the present invention can be properly scheduled in a maneuvering target scenario, whereas traditional modern homing guidance laws cannot.

A second new feature of the present invention accounts for cross-channel couplings typically ignored in traditional homing guidance laws. When cross-channel couplings are ignored, an action in one channel produces an effect in the other channel which then must be responded-to, producing in turn an effect in the original channel, etc. This can lead to excessive control activity which dissipates the missile's energy. By accounting for cross-channel couplings in the present invention algorithm, the cross-channel effects are handled simultaneously, not sequentially, thereby negating or significantly attenuating cross-channel response.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. Missile and target acceleration tolerant, azimuth channel and elevation cross-channel coupling-inclusive air to air homing missile guidance apparatus comprising the combination of:
    an autopilot apparatus operably connected with flight control fin surfaces of said missile;
    sensor elements generating electrical output signals representative of trajectory changes accomplished by said target and said missile;
    missile guidance algorithm apparatus located intermediate said sensor elements and said autopilot apparatus and generating elevation channel and azimuth channel missile command signals, signals responsive to trajectory changes of said missile and said target;
    said missile guidance algorithm apparatus incorporating an embodied mathematical relationship including:
        an azimuth channel line-of-sight rate first azimuth input parameter multiplied by a first azimuth gain determination coefficient;
        an azimuth channel target acceleration second azimuth input parameter multiplied by a second azimuth gain determination coefficient;
        an azimuth channel target elevation acceleration cross-channel third azimuth input parameter multiplied by a third azimuth gain determination coefficient;
        an azimuth channel missile azimuth velocity cross-channel fourth azimuth input parameter multiplied by a fourth azimuth gain determination coefficient;
        an azimuth channel missile elevation velocity fifth azimuth input parameter multiplied by a fifth azimuth gain determination coefficient;
        an azimuth channel missile azimuth acceleration sixth azimuth input parameter multiplied by a sixth azimuth gain determination coefficient;
        an azimuth channel missile elevation acceleration cross-channel seventh azimuth input parameter multiplied by a seventh azimuth gain determination coefficient;
        an elevation channel line-of-sight rate first elevation input parameter multiplied by a first elevation gain determination coefficient;
        an elevation channel target acceleration rate cross-channel second elevation input parameter multiplied by a second elevation gain determination coefficient;
        an elevation channel target elevation acceleration third elevation input parameter multiplied by a third elevation gain determination coefficient;
        an elevation channel missile azimuth velocity cross-channel fourth elevation input parameter multiplied by a fourth elevation gain determination coefficient;
        an elevation channel missile elevation velocity fifth elevation input parameter multiplied by a fifth elevation gain determination coefficient;
        an elevation channel missile elevation velocity change sixth elevation input parameter multiplied by a sixth elevation gain determination coefficient; and
        an elevation channel missile azimuth velocity change seventh cross-channel elevation input parameter multiplied by a seventh elevation gain determination coefficient.

2. The air to air homing missile guidance apparatus of claim 1 wherein selected of said gain determining coefficients have zero magnitude in response to an absence of cross-channel coupling in said embodied algorithm.

3. The air to air homing missile guidance apparatus of claim 2 wherein said zero magnitude gain determining coefficients include selected of:
    said third azimuth gain determination coefficient;
    said fourth azimuth gain determination coefficient;
    said fifth azimuth gain determination coefficient;
    said second elevation gain determination coefficient;
    said fourth elevation gain determination coefficient; and
    said sixth elevation gain determination coefficient;
in response to an absence of cross-channel coupling in said embodied algorithm.

4. The air to air homing missile guidance apparatus of claim 1 wherein said missile guidance algorithm apparatus elevation channel and azimuth channel control signals are angular rate signals.

5. The air to air homing missile guidance apparatus of claim 4 wherein said first azimuth gain determination coefficient and said first elevation gain determination coefficient are of the form $(2K_1-K_2)$ where $K_1$ is twice a closing velocity divided by $V_{M_r}$, a missile velocity component, and $K_2$ is a navigation ratio weighting term.

6. The air to air homing missile guidance apparatus of claim 4 wherein said second azimuth gain determination coefficient and said second elevation gain determination coefficient are of the form of $$\frac{2c_2(K_1-K_2)[\lambda+c_1(K_1-K_2)]}{[\lambda+c_1(K_1-K_2)]^2+c_3^2}$$

wherein said $\lambda$ term is $\lambda_{AZ}$, a first target acceleration inverse time constant in said second azimuth gain determination coefficient; is $\lambda_{EL}$ a second target acceleration inverse time constant in said second elevation gain determination coefficient; and where $c_1$ is $V_{M_r}/r$, a missile velocity component divided by range, r; $c_2$ represents inverse range, 1/r; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

7. The air to air homing missile guidance apparatus of claim 4 wherein said third azimuth gain determination coefficient and said third elevation gain determination coefficient are of the form of $$\frac{2c_2c_3(K_1-K_2)}{[\lambda+c_1(K_1-K_2)]^2+c_3^2}$$

wherein said $\lambda$ term is $\lambda_{AZ}$, a first target acceleration inverse time constant in said third azimuth gain determination coefficient; where $\lambda_{EL}$ is a second target acceleration inverse time constant in said third elevation gain determination coefficient; and where $c_1$ is $V_{M_r}/r$, a missile velocity component divided by range, r; $C_2$ represents inverse range, 1/r; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

8. The air to air homing missile guidance apparatus of claim 4 wherein said fourth azimuth gain determination coefficient and said fourth elevation gain determination coefficient are of the form of $$\frac{2c_2c_3\omega_r(K_1-K_2)}{c_1^2(K_1-K_2)^2+c_3^2}$$

wherein said $c_1$ is $V_{M_r}/r$, a missile velocity component divided by range, r; $c_2$ represents inverse range, 1/r; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

9. The air to air homing missile guidance apparatus of claim 4 wherein said fifth azimuth gain determination coefficient and said fifth elevation gain determination coefficient are of the form of $$\frac{2c_1c_2\omega_r(K_1-K_2)^2}{c_1^2(K_1-K_2)^2+c_3^2}$$

wherein said $c_1$ is $V_{M_r}/r$, a missile velocity component divided by range, r; $c_2$ represents inverse range, 1/r; $c_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

10. The air to air homing missile guidance apparatus of claim 4 wherein said sixth azimuth gain determination coefficient and said sixth elevation gain determination coefficient are of the form of $$\frac{2c_1c_2(K_1-K_2)^2[c_1^2(K_1-K_2)^2+c_3(2\omega_r+c_3)]}{[c_1^2(K_1-K_2)^2+c_3^2]^2}$$

wherein said $c_1$ is $V_{M_r}/r$, a missile velocity component divided by range, r; $C_2$ represents inverse range, 1/r; $c_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

11. The air to air homing missile guidance apparatus of claim 4 wherein said seventh azimuth gain determination coefficient and said seventh elevation gain determination coefficient are of the form of $$\frac{2c_2(K_1-K_2)[\omega_r\{-c_1^2(K_1-K_2)^2+c_3^2\}+c_3\{c_1^2(K_1-K_2)^2+c_3^2\}]}{[c_1^2(K_1-K_2)^2+c_3^2]^2}$$

wherein said $C_1$ is $V_{M_r}/r$, a missile velocity component divided by range, r; $c_2$ represents inverse range, 1/r; $c_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

12. The air to air homing missile guidance apparatus of claim 1 wherein said missile guidance algorithm apparatus elevation channel and azimuth channel missile command signals are linear acceleration signals generated by multiplication of angular rate algorithm mathematical equations by a missile velocity-related term to generate a linear acceleration guidance algorithm.

13. The air to air homing missile guidance apparatus of claim 12 wherein said missile velocity-related term is a missile velocity component, $V_{M_r}$, along a line-of-sight direction.

14. The air to air homing missile guidance apparatus of claim 13 wherein said first azimuth gain determination coefficient and said first elevation gain determination coefficient are of the form of $(2K_1-K_2)V_{M_r}$ where $K_1$ is twice a closing velocity divided by $V_{M_r}$, a missile velocity component, and $K_2$ is a navigation ratio weighting term.

15. The air to air homing missile guidance apparatus of claim 13 wherein said second azimuth gain determination coefficient and said second elevation gain determination coefficient are of the form of $$\frac{2c_1(K_1-K_2)[\lambda+c_1(K_1-K_2)]}{[\lambda+c_1(K_1-K_2)]^2+c_3^2}$$

wherein said $\lambda$ term is $\lambda_{AZ}$, a first target acceleration inverse time constant in said second azimuth gain determination coefficient; is $\lambda_{EL}$ a second target acceleration inverse time constant in said second elevation gain determination coefficient; and where $c_1$ is $V_{M_r}/r$, a missile velocity component divided by range, r; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

16. The air to air homing missile guidance apparatus of claim 13 wherein said third azimuth gain determination coefficient and said third elevation gain determination coefficient are of the form of $$\frac{2c_1 c_3 (K_1 - K_2)}{[\lambda + c_1(K_1 - K_2)]^2 + c_3^2}$$

wherein said $\lambda$ term is $\lambda_{AZ}$, a first target acceleration inverse time constant in said third azimuth gain determination coefficient; where $\lambda_{EL}$ is a second target acceleration inverse time constant in said third elevation gain determination coefficient; and where $C_2$ represents inverse range, $1/r$; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

17. The air to air homing missile guidance apparatus of claim 13 wherein said fourth azimuth gain determination coefficient and said fourth elevation gain determination coefficient are of the form of $$\frac{2c_1 c_3 \omega_r (K_1 - K_2)}{c_1^2 (K_1 - K_2)^2 + c_3^2}$$

wherein said $c_1$ is $V_{M_r}/r$, a missile velocity component divided by range, r; $c_3$ is line-of-sight rate in said azimuth channel times the tangent of line-of-sight angle in said elevation channel; $K_1$ is twice a closing velocity divided by $V_{M_r}$; and $K_2$ is a navigation ratio weighting term.

18. The air to air homing missile guidance apparatus of claim 13 wherein said fifth azimuth gain determination coefficient and said fifth elevation gain determination coefficient: are of the form of $$\frac{2c_1^2 \omega_r (K_1 - K_2)^2}{c_1^2 (K_1 - K_2)^2 + c_3^2}$$

wherein said $c_1$ is $V_{M_r}/r$, a missile velocity component divided by range, r; $c_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

19. The air to air homing missile guidance apparatus of claim 13 wherein said sixth azimuth gain determination coefficient and said sixth elevation gain determination coefficient are of the form of $$\frac{2c_1^2 (K_1 - K_2)^2 \left[ c_1^2 (K_1 - K_2)^2 + c_3 (2\omega_r + c_3) \right]}{\left[ c_1^2 (K_1 - K_2)^2 + c_3^2 \right]^2}$$

wherein said $c_1$ is $V_{M_r}/r$, a missile velocity component divided by range, r; $c_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

20. The air to air homing missile guidance apparatus of claim 13 wherein said seventh azimuth gain determination coefficient and said seventh elevation gain determination coefficient are of the form of $$\frac{2c_1(K_1 - K_2)\left[\omega_r\{-c_1^2(K_1 - K_2)^2 + c_3^2\} + c_3\{c_1^2(K_1 - K_2)^2 + c_3^2\}\right]}{[c_1^2(K_1 - K_2)^2 + c_3^2]^2}$$

wherein said $c_1$ is $V_{M_r}/r$, a missile velocity component divided by range, r; $C_3$ is line-of-sight rate in said azimuth channel times the tangent of line-of-sight angle in said elevation channel; $\omega_r$ is the angular rate of velocity vector about a line-of-sight direction; $K_1$ is twice a closing velocity divided by $V_{M_r}$; and $K_2$ is a navigation ratio weighting term.

21. The method of guiding a homing missile to a maneuvering airborne target, said method comprising the steps of:

bringing said missile within seeker range of said target;

determining flight path azimuth and elevation rates for said missile using an embodied guidance algorithm having target-related, missile-related, and relative target/missile related state terms;

said algorithm including target acceleration, missile velocity, missile acceleration and line-of-sight rate state terms in each of an azimuth signal channel equation and an elevation signal channel equation;

said algorithm also including azimuth signal channel and elevation signal cross-channel coupling-related terms;

generating new flight path azimuth and elevation rates for said missile in response to successive updating changes in said target acceleration, missile velocity, missile acceleration, line-of-sight rate and cross-channel coupling-related algorithm terms;

said generating step including determining new flight path azimuth and elevation rates for said missile following disturbance of a guidance process by either of target maneuvering and missile maneuvering accelerations;

repeating said generating step at selected intervals until said missile is deemed sufficiently close to said target for effective detonation.

22. The method of guiding of claim 21 wherein said azimuth and elevation rates and said line-of-sight rate are angular rates.

23. The method of guiding of claim 21 wherein said algorithm azimuth signal channel and elevation signal cross-channel coupling-related terms include cross-channel target acceleration, cross-channel missile velocity and cross-channel missile acceleration terms.

24. The method of guiding of claim 21 wherein said algorithm azimuth and elevation rates and said line-of-sight rate are angular rates and further including the step of:

multiplying each side of an equation defining an algorithm azimuth signal channel angular rate and an equation defining an elevation signal channel angular rate by a linear acceleration-generating, missile related, state variable to generate a linear acceleration rate algorithm.

* * * * *